US006638196B2

(12) United States Patent
Murasugi et al.

(10) Patent No.: US 6,638,196 B2
(45) Date of Patent: Oct. 28, 2003

(54) SHIFT CONTROL APPARATUS OF AUTOMATIC TRANSMISSIONS

(75) Inventors: Takashi Murasugi, Shizuoka (JP); Takashi Sano, Shizuoka (JP); Kazunari Otake, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/936,811
(22) PCT Filed: Jun. 20, 2001
(86) PCT No.: PCT/JP01/05283
§ 371 (c)(1), (2), (4) Date: Sep. 18, 2001
(87) PCT Pub. No.: WO02/23068
PCT Pub. Date: Mar. 21, 2002

(65) Prior Publication Data
US 2002/0173406 A1 Nov. 21, 2002

(30) Foreign Application Priority Data
Sep. 18, 2000 (JP) ........................................ 2000-282334
Sep. 18, 2000 (JP) ........................................ 2000-282335

(51) Int. Cl.[7] ............................................... F16H 61/26
(52) U.S. Cl. ........................................ 477/156; 477/143
(58) Field of Search ................................ 477/156, 120, 477/143, 158, 162

(56) References Cited

U.S. PATENT DOCUMENTS

| 3,747,439 A | 7/1973 | Uozumi et al. | ............... 74/869 |
| 4,942,787 A | 7/1990 | Aoki et al. | .................... 74/867 |
| 5,397,284 A | 3/1995 | Matsumoto et al. | ........ 477/150 |
| 5,741,203 A | * | 4/1998 | Nishio | ........................ 477/120 |
| 5,803,867 A | 9/1998 | Sato et al. | .................. 477/151 |
| 5,865,708 A | * | 2/1999 | Nishio et al. | ............... 477/154 |
| 5,916,058 A | * | 6/1999 | Sakai et al. | ................. 477/114 |
| 5,931,885 A | 8/1999 | Kubo et al. | .................... 701/51 |

FOREIGN PATENT DOCUMENTS

| JP | 61-106654 | 7/1986 |
| JP | 1-224549 | 9/1989 |
| JP | 9-32912 | 2/1997 |

OTHER PUBLICATIONS

U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.

(List continued on next page.)

Primary Examiner—Sherry Estremsky
Assistant Examiner—Tisha D. Lewis
(74) Attorney, Agent, or Firm—Foley & Lardner

(57) ABSTRACT

A shift control apparatus is arranged to effect a shift in an automatic transmission by changeover of friction elements to be engaged with disengagement of a disengagement-side friction element and engagement of an engagement-side friction element. A shift controller is configured to detect an end of a loss stroke in the engagement-side friction element, and performs an operation to decrease the disengagement-side working oil pressure at a set gradient and to increase the engagement-side working oil pressure at a predetermined gradient upon detection of the end of the loss stroke in the engagement-side friction element. The predetermined gradient of the engagement-side working oil pressure for the engagement-side friction element is made lower for a low engine load than for a high engine load.

14 Claims, 12 Drawing Sheets

OTHER PUBLICATIONS

U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.

U.S. patent application Ser. No. 09/954,019, Saito, filed Sep. 18, 2001.

U.S. patent application Ser. No. 09/954,298, Saito, filed Sep. 18, 2001.

* cited by examiner

FIG.2

|   | R/C | H/C | L/C | LR/B | L/OWC | 2-4/B |
|---|---|---|---|---|---|---|
| 1st |  |  | ○ | (○) | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

FIG.10B AT HIGH THROTTLE OPENING DEGREE

FIG.10C AT LOW THROTTLE OPENING DEGREE

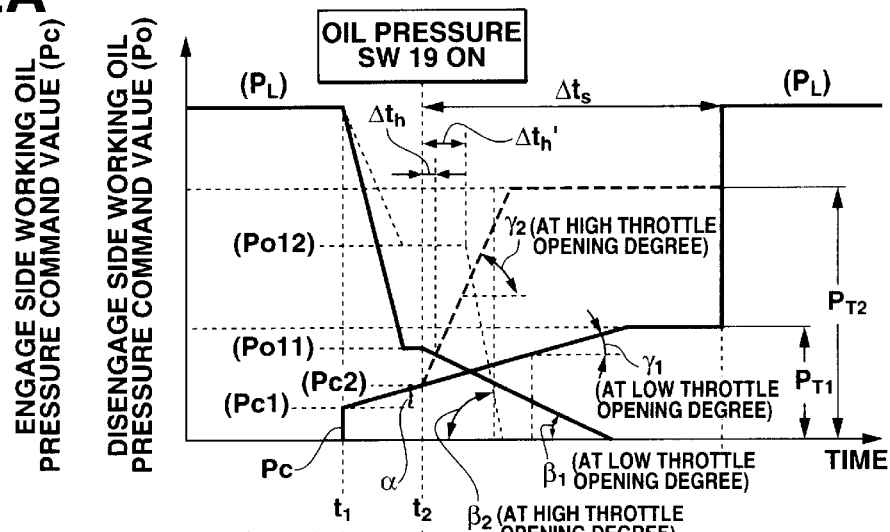
FIG.12A
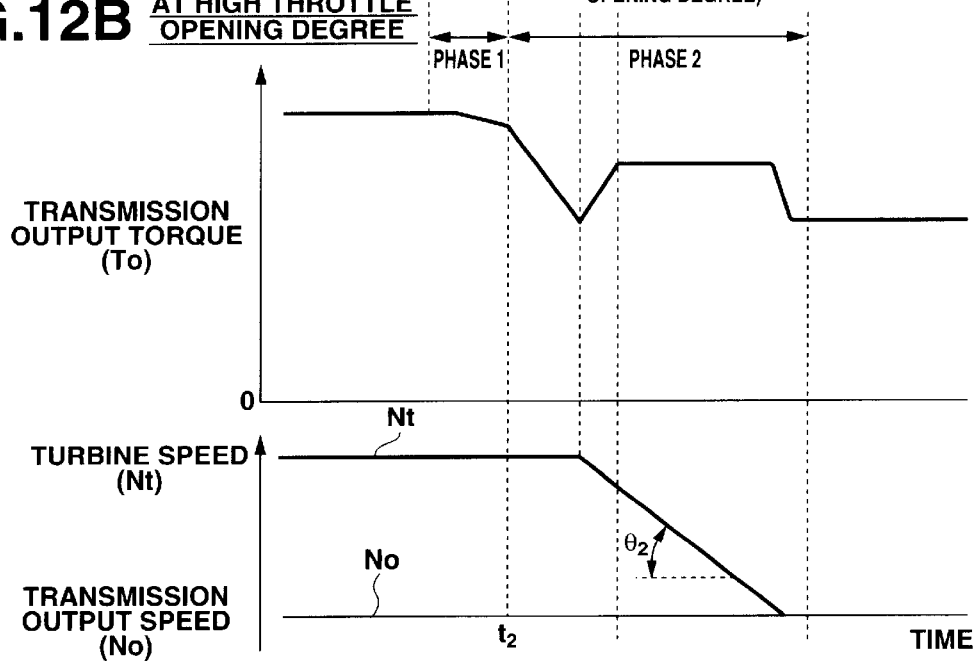
FIG.12B AT HIGH THROTTLE OPENING DEGREE
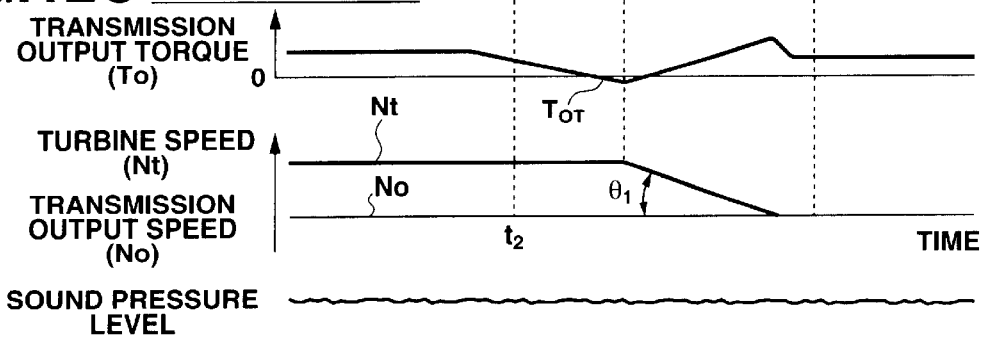
FIG.12C AT LOW THROTTLE OPENING DEGREE

FIG.13B  AT HIGH THROTTLE OPENING DEGREE

FIG.13C  AT LOW THROTTLE OPENING DEGREE

SHIFT CONTROL APPARATUS OF AUTOMATIC TRANSMISSIONS

TECHNICAL FIELD

The present invention relates to a shift control apparatus for an automatic transmission and, especially, to a shift control apparatus for executing such a proper shift as is done by a changeover of friction elements, of which one friction element is brought into disengagement whereas another friction element is brought into engagement.

BACKGROUND ART

In the automatic transmission, there is a shift to be executed by the so-called "changeover of friction elements", in which one friction element is brought into disengagement as the working oil pressure lowers whereas another friction element is brought into engagement as the working oil pressure rises.

Herein: the friction elements to be changed over from an engaging state to a disengaging state at the time of said changeover shift will be called the "disengagement side friction elements"; the working oil pressure will be called the "disengagement side working oil pressure"; and the friction elements to be switched from the disengaging state to the engaging state will be called the "engagement side friction elements"; and the working oil pressure will be called the "engagement side working oil pressure".

At said changeover shift, the control to lower the disengagement side working oil pressure for bringing the disengagement side friction element into disengagement and the control to raise the engagement side working oil pressure for bringing the engagement side friction element into engagement are known in the prior art, as disclosed in Unexamined Published Japanese Patent Application No. 1-224549, for example.

By raising an engagement side working oil pressure $P_C$ from a shift command instant $t_1$, as illustrated in FIG. 13(a), an engagement side friction element is stroked against a return spring, and it is detected by an oil pressure switch to be turned ON at $P_C=P_1$ that the engagement side friction element ends a loss stroke.

A disengagement side working oil pressure $P_0$ is so abruptly lowered to $P_4$ for the time period from a shift command instant $t_1$ to an instant of the loss stroke end detection of the engagement side friction element as to take an engaging capacity just before the disengagement side friction element starts to slip, and is so slowly lowered till an instant $t_5$ as to effect the aforementioned changeover, until it is abruptly lowered to 0.

On the other hand, the engagement side working oil pressure $P_C$ is so abruptly raised to an initial pressure $P_2$ that the aforementioned changeover may be started at and after the detection instant $t_2$ of the loss stroke end of the engagement side friction element to start a torque phase, and is further raised at a predetermined slow shelf pressure gradient to a pressure $P_3$, at which an inertia phase ends, until it is raised to the highest level till an instant $t_7$.

In a common sense, during the shelf pressure control of the engagement side working oil pressure $P_C$, the engagement side friction element has to share the transmission input torque. It is, therefore, ordinary that the shelf pressure of the engagement side working oil pressure $P_C$ is raised, as indicated by a broken line, as an engine throttle opening degree TVO increases.

When the throttle opening degree TVO is high, therefore, the engagement side working oil pressure $P_C$ is abruptly raised for advancing the torque phase from the instant $t_3$ to a later instant $t_4$.

Here in the shift control apparatus of the prior art thus far described, the changing rate at the time when the engagement side working oil pressure $P_C$ is raised to the initial shelf pressure from the detection instant $t_2$ of the loss stroke end of the engagement side friction element is given a constant gradient independently of the throttle opening degree TVO. Therefore, this gradient has to be relatively steepened for ending the torque phase within a predetermined short time period even for a high throttle opening degree, and the following problem may occur.

Here, the time-series changes of a turbine speed $N_t$ (or a transmission input speed) and a transmission output torque $T_O$ at a high throttle opening degree for determining the engagement side working oil pressure $P_C$, as indicated by a broken line, are illustrated in FIG. 13B. On the other hand, the time-series changes of a turbine speed $N_t$ (or the transmission input speed) and the transmission output torque $T_O$ at a low throttle opening degree for determining the engagement side working oil pressure $P_C$, as indicated by a solid line, are illustrated in FIG. 13C.

At the high throttle opening degree, the transmission output torque $T_O$ is relatively high, as illustrated in FIG. 13B, even if the torque falls at $T_{OT}$ in the torque phase, the transmission output torque $T_O$ does not take a negative value, and no serious tossing shock occurs just after the fall.

However, the changing rate at which the engagement side working oil pressure $P_C$ is raised to the initial shelf pressure from the loss stroke ending instant $t_2$ of the engagement side friction element has a constant gradient independently of the throttle opening degree TVO. As apparent from the comparison of the turbine speed $N_t$ illustrated in FIGS. 13B and 13C, therefore, the shift advances at a rate similar to that of the high throttle opening degree even at the low throttle opening degree having the small transmission output torque $T_O$ so that the turbine speed $N_t$ reaches that (i.e., the speed equal to a transmission output speed $N_o$ because $N_t$ e of the shift to the 3rd speed having a gear ratio 1 in the case of FIG. 13) after the shift. At the low throttle opening degree, therefore, the rising rate (or the torque phase advancing rate) of the engagement side working oil pressure $P_C$ during that period is excessive high, and the transmission output torque $T_O$ is relatively low, as illustrated in FIG. 13C. Hence, there is caused the so-called "zero cross of the transmission output torque", in which the fall $T_{OT}$ in the torque phase makes the transmission output torque $T_O$ once negative and then returns it to a positive value. There arises a problem that a serious tossing shock $T_{OS}$ is caused just after the zero cross.

Here, the zero cross of the transmission output torque reverses the direction of the torque for a short time thereby to generate a backlash noise between the gears in the gear transmission mechanism of the automatic transmission to cause the noise, as indicated as the sound pressure level in FIG. 13C.

This problem of the backlash or the aforementioned serious tossing shock $T_{OS}$ is easily transmitted to the passenger at the low throttle opening degree because the transmission output torque $T_O$ is intrinsically low, and it has to be avoided.

In the aforementioned control of the prior art, on the other hand, the instant $t_3$ at which the disengagement side working oil pressure $P_O$ is to be abruptly lowered is usually controlled by an orifice control valve disposed in the hydraulic circuit, and this orifice control valve acts when the engagement side working oil pressure $P_C$ exceeds its set pressure. Thus, there arises a second problem that the disengagement side working oil pressure $P_O$ abruptly drops.

The set pressure of the orifice control valve is constant. Therefore, the set pressure has to be set at a high level so as to prevent the racing of the engine, i.e., an abrupt rise in the engine speed, which might otherwise be caused when the engaging capacities of the individual friction elements on the engagement side and the disengagement side become short for a shifting action at a high throttle opening degree TVO.

Where the orifice control valve is given a high set value, the engaging capacity of the disengagement side friction element is excessive at the shifting action for an intermediate or low throttle opening degree TVO. As a result, the transmission output torque $T_O$ drops (or falls) and abruptly rises (or tosses) in the deep and long torque of the torque phase. As a result, the drivability or riding comfortableness of the vehicle is adversely affected by making a smooth shifting action difficult and by causing a serious shock during the shifting action.

On the other hand, the time period for which the individual friction elements on the engagement side and on the disengagement side are in slipping states is elongated to increase the calorific power in each friction element thereby to affect the durability of the friction element adversely.

DISCLOSURE OF THE INVENTION

A first invention, as described in claim 1, has an object to solve the aforementioned first problem in the apparatus of the prior art, on the basis of a fact recognition that the first embodiment is caused because the changing rate at the time when the engagement side working oil pressure is raised to the initial shelf pressure from the loss stroke ending time of the engagement side friction element is made a constant gradient independently of the engine load, by changing the rising rate of the engagement side working oil pressure after the end of the loss stroke by the engagement side friction element in accordance with the engine load.

A second invention, as described in claim 2, has an object to make the aforementioned action and effect more reliable by controlling the lowering gradient of the disengagement side working oil pressure at and after the loss stroke ending time of the engagement side friction element, too.

A third invention, as described in claim 3, has an object to advance the inertia phase after the torque phase properly by properly determining the upper limit at the time when the engagement side working oil pressure is raised from the loss stroke ending time of the engagement side friction element.

A fourth invention, as described in claim 4, has an object to solve the aforementioned second problem in the prior art apparatus, by setting the working oil pressure of the disengagement side friction element constant in the changeover shifting action for a predetermined time period from the loss stroke ending time and then by lowering the working oil pressure at a predetermined gradient.

A fifth invention, as described in claim 5, has an object to ensure the aforementioned actions and effects by making constant the predetermined time period for keeping the working oil pressure of the disengagement side friction element in the changeover shifting action, variable according to the throttle opening degree.

A sixth invention, as described in claim 6, has an object to ensure the aforementioned actions and effects by making the constant value for holding the working oil pressure of the disengagement side friction element for the predetermined time period from the loss stroke ending time in the changeover shifting action, variable according to the throttle opening degree.

A seventh invention, as described in claim 7, has an object to ensure the aforementioned actions and effects by changing the rising gradient of the working oil pressure of the engagement side friction element and the lowering gradient of the working oil pressure of the disengagement side friction element in the changeover shifting action, in accordance with the throttle opening degree.

In order to achieve the above-specified objects, according to the first invention, in an automatic transmission having a shift to be effected by such a changeover of friction elements that, while one friction element is being brought into disengagement by lowering a working oil pressure, another friction element is brought into engagement by raising the working oil pressure, and that, after the end of a loss stroke of said another friction element was detected, the working oil pressure for said one friction element is lowered at a set gradient whereas the working oil pressure for said another friction element is raised at a predetermined gradient, it is characterized that the predetermined gradient of the working oil pressure for said another friction element is made lower for a low engine load than for a high engine load.

At the time of the changeover shift of the automatic transmission to be effected by raising the working oil pressure, while lowering the working oil pressure to bring one friction element into disengagement, to bring another friction element into engagement, after it is detected from the rise in the working oil pressure that said another friction element has ended the loss stroke, the changeover shift is advanced by lowering the working oil pressure for said one friction element at a set gradient and by raising the working oil pressure for said another friction element at the predetermined gradient.

Here in the first invention, the predetermined gradient of the working oil pressure for said another friction element is made lower at the low engine load than at the high engine load. Therefore, the changing rate at the time when the working oil pressure for said another friction element or the engagement side friction element, i.e., the engagement side working oil pressure is raised after the loss stroke end of the engagement side friction element is lower than that at the high engine load so that the shift (or the torque phase) at the low engine load for the low transmission output torque can be advanced more slowly than at the high engine load.

Therefore, the rising rate (or the torque phase advancing rate) of the engagement side working oil pressure for the low engine load after the loss stroke end is not excessively high. Even if the transmission output torque is relatively low for the low engine load the fall of the torque in the torque phase causes the zero cross of the transmission output torque, therefore, the transmission output torque in the zero cross gently changes to cause no backlash noise and no serious tossing shock just after the torque phase end.

In the first invention, on the other hand, the second invention is characterized in that the set gradient of the working oil pressure for said one friction element is made lower for the low engine load than for the high engine load.

In this second invention, the set gradient of the working oil pressure for said one friction element is made smaller at the low engine load than at the high engine load. As a result, the lowering gradient of the working oil pressure (or the disengagement side working oil pressure) for said one friction element (or the disengagement side friction element) at and after the loss stroke end of the engagement side friction element is made lower at the low engine load than at the high engine load. The drop of the disengagement side working oil pressure for the rise of the engagement side working oil pressure controlled as in the first invention can be properly timed to smoothen the changeover between the engagement side friction element and the disengagement side friction element thereby to make the action and effect of the first invention more reliable.

In the first invention or the second invention, the third invention is characterized in that the upper limit for raising the working oil pressure for said another friction element at said predetermined gradient is the sum of: a return spring pressure for balancing an oil pressure necessary at the end of a piston stroke; a torque sharing pressure for an engaging capacity barely capable of transmitting a transmission input torque; and an inertia induced pressure necessary for proceeding an inertia phase.

In the third invention, the upper limit for raising the working oil pressure for said another friction element at said predetermined gradient is the sum of: a return spring pressure for balancing an oil pressure necessary at the end of a piston stroke; a torque sharing pressure for an engaging capacity barely capable of transmitting a transmission input torque; and an inertia induced pressure necessary for proceeding an inertia phase. Therefore, the working oil pressure of said another friction element (or the engagement side friction element) for advancing the inertia phase after the torque phase takes a proper value for establishing a proper engaging capacity so that the inertia phase can be properly advanced.

According to the fifth invention, in an automatic transmission having a shift to be effected by such a changeover of first and second ones of a plurality of friction elements that said first friction element is brought into engagement by raising a working oil pressure and that after a set time in response to a pressure signal on the working oil pressure of said first friction element, said second friction element is brought into disengagement by lowering the working oil pressure, and that, after the end of a loss stroke of said first friction element was detected, the working oil pressure for said second friction element is lowered at a set gradient whereas the working oil pressure for said first friction element is raised at a predetermined gradient, it is characterized that the working oil pressure for said second friction element is held at a constant value for a predetermined time period after the end of said loss stroke and is lowered at said set gradient after lapse of said predetermined time period.

In this fourth invention, when the working oil pressure for the second friction element at and after the detection instant of the loss stroke end is to be lowered at the set gradient, the working oil pressure is kept constant for a predetermined time period from the detection instant of the loss stroke end and is then lowered at said set gradient.

As a result, the racing of the engine can be prevented for the high throttle opening degree, and a satisfactory shifting action having a torque fall of small length and depth can be realized for the intermediate or low throttle opening degree.

In the fourth invention, the fifth invention is characterized in that said predetermined time period is so changed according to a throttle opening degree that it may be the longer as said throttle opening degree is the higher and the shorter as said throttle opening degree is the lower.

In this fifth invention, said predetermined time period for keeping the working oil pressure for said second friction element constant from the detection instant of the loss stroke end is so changed according to a throttle opening degree that it may be the longer as said throttle opening degree is the higher and the shorter as said throttle opening degree is the lower. By thus setting said predetermined time period, the aforementioned action and effect of the first invention can be made reliable.

In the fourth or fifth invention, the sixth invention is characterized in that said constant value of the working oil pressure for said second friction element is so changed according to the throttle opening degree that it may be the higher as said throttle opening degree is the higher and the lower as said throttle opening degree is the lower.

In this sixth invention, said constant value for holding the working oil pressure for said predetermined time period from the detection instant of the loss stroke end for said second friction element is so changed according to the throttle opening degree that it may be the higher as said throttle opening degree is the higher and the lower as said throttle opening degree is the lower. By thus setting said constant value, the aforementioned actions and effects of the fourth and fifth inventions can be made more reliable.

In any of the fourth to sixth inventions, the seventh invention is characterized in that the rising gradient of the working oil pressure for said first friction element and the lowering gradient of the working oil pressure for said second friction element are so changed according to the throttle opening degree that said individual gradients may be the larger as said throttle opening degree is the higher and the smaller as said throttle opening degree is the lower.

In this seventh invention, the rising gradient of the working oil pressure for said first friction element and the lowering gradient of the working oil pressure for said second friction element in the changeover shifting action are made the larger as said throttle opening degree is the higher and the smaller as said throttle opening degree is the lower. Therefore, the actions and effects of the aforementioned individual inventions can be made more reliable.

BRIEF DESCRIPTION OF THE DRAWINGS

FIG. 2 is a diagram tabulating relations between the selected gear stages of the automatic transmission and the engaging logic of friction elements.

FIG. 10 is a time chart of the case in which the shift control apparatus of the same Embodiment makes a drive-up changeover shift:

FIG. 10B is a time chart illustrating the time-series changes of a transmission output torque and a turbine speed at the time when the engagement side working oil pressure command value and the disengagement side working oil pressure command value are controlled for a high throttle opening degree; and FIG. 10C is a time chart illustrating the time-series changes of the transmission output torque and the turbine speed at the time when the engagement side working oil pressure command value and the disengagement side working oil pressure command value are controlled for a low throttle opening degree.

FIG. 12 is a time chart of the case in which the shift control apparatus of the same Embodiment 2 makes a drive-up changeover shift:

FIG. 12A is a time chart illustrating the time series changes of the engagement side working oil pressure command value and the disengagement side working oil pressure command value;

FIG. 12B is a time chart illustrating the time-series changes of a transmission output torque and a turbine speed at the time when the engagement side working oil pressure command value and the disengagement side working oil pressure command value are controlled for a high throttle opening degree; and FIG. 12C is a time chart illustrating the time-series changes of the transmission output torque and the turbine speed at the time when the engagement side working oil pressure command value and the disengagement side working oil pressure command value are controlled for a low throttle opening degree.

FIG. 13 is a time chart of the case in which the shift control apparatus of the prior art makes a changeover shift:

FIG. 13B is a time chart illustrating the time-series changes of a transmission output torque and a turbine speed at the time when the engagement side working oil pressure and the disengagement side working oil pressure are controlled for a high throttle opening degree; and FIG. 13C is a time chart illustrating the time-series changes of the transmission output torque and the turbine speed at the time when the engagement side working oil pressure and the disengagement side working oil pressure are controlled for a low throttle opening degree.

BEST MODE FOR CARRYING OUT THE INVENTION

Here will be described the individual embodiments of the invention with reference to the accompanying drawings.

Embodiment 1

Figure 1:
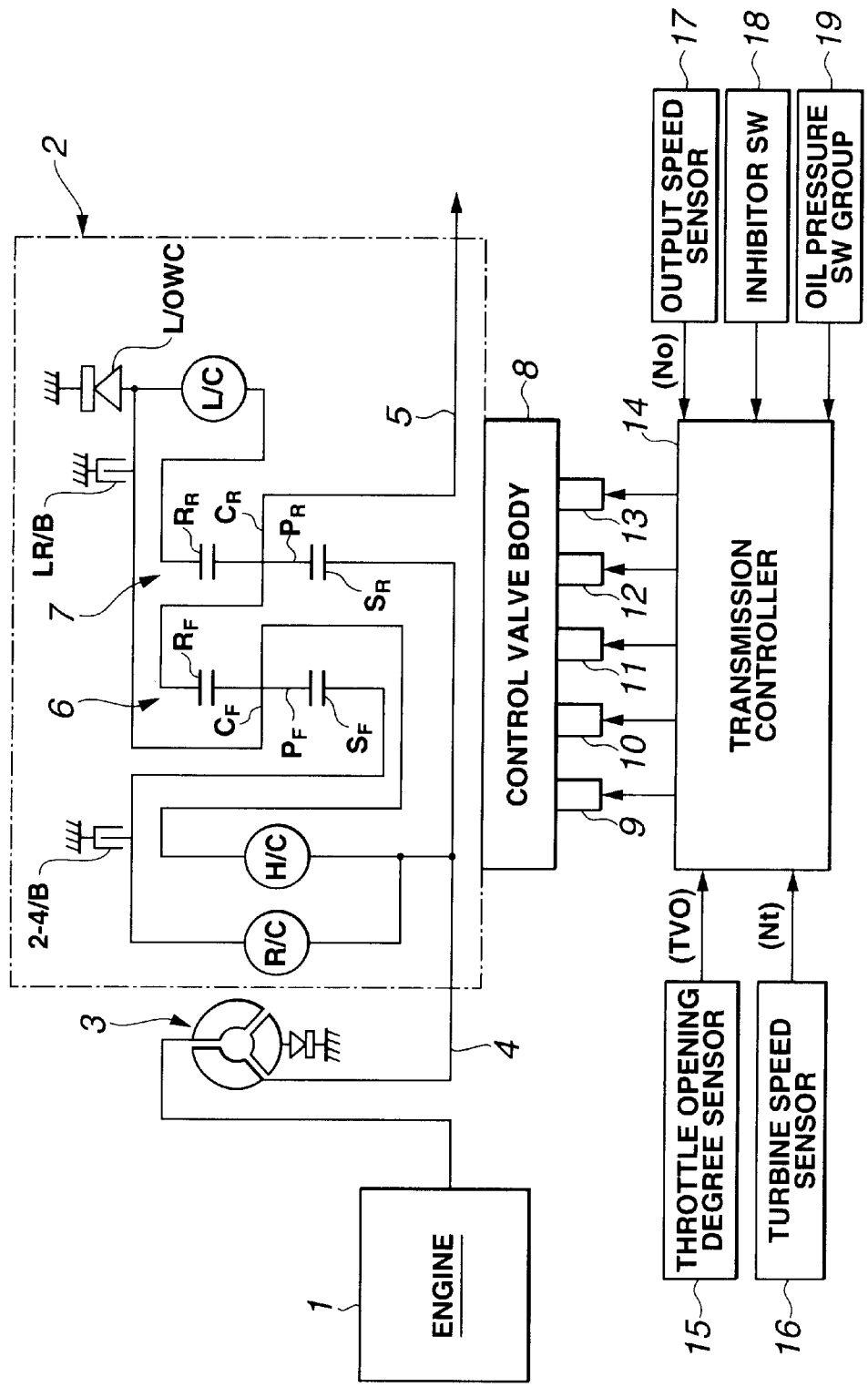
FIG. 1 is a schematic flow chart showing a transmission train of an automatic transmission provided with a shift control apparatus according to Embodiment 1 of the invention, and its shift control system.

FIG. 1 shows a shift control apparatus for an automatic transmission according to Embodiment 1 of the invention corresponding to claims 1 to 3. Reference numeral 1 designates an engine, and numeral 2 designates an automatic transmission.

The engine 1 has an output increased/decreased by a throttle valve which is increased in its opening degree from a fully closed state to a fully opened state as an accelerator pedal is depressed by the driver. The output rotation of the engine 1 is inputted through a torque converter 3 to an input shaft 4 of the automatic transmission 2.

The automatic transmission 2 is provided with a front planetary gear set 6 and a rear planetary gear set 7, which are mounted sequentially from the side toward the engine 1 on an input shaft 4 and an output shaft 5 arranged in a coaxial end to end butting relation. These elements are the major components of a planetary gear transmission mechanism in the automatic transmission 2.

The front planetary gear set 6 near the engine 1 is a simple planetary gear set which is composed of a front sun gear $S_F$, a front ring gear $R_F$, a front pinion $P_F$ meshing with the former gears, and a front carrier $C_F$ supporting the front pinion rotatably. The planetary gear set 7 apart from the engine 1 is also a simple planetary gear set which is composed of a rear sun gear $S_R$, a rear ring gear $R_R$, a rear pinion $P_R$ meshing with the former gears, and a rear carrier $C_R$ supporting the rear pinion rotatably.

As the friction elements for determining the transmission path (or the gear stage) of the planetary gear transmission mechanism, there are enumerated a low clutch L/C, a 2nd/4th speed brakes 2–4/B, a high clutch h/C, a low reverse brake LR/B, a low one-way clutch L/OWC, and a reverse clutch R/C, which are arranged in a correlated manner to the components of the two planetary gear sets 6 and 7 in the following manners. Specifically, the front sun gear $S_F$ can be suitably coupled to the input shaft 4 by the reverse clutch R/C and can be suitably fixed by the 2nd/4th speed brake 2–4/B.

The front carrier $C_F$ can be suitably coupled to the input shaft 4 by the high clutch H/C.

The front carrier $C_F$ can be further blocked from the rotation backward of the engine rotation by the low one-way clutch L/OWC and can be suitably fixed by the low reverse brake LR/B.

Moreover, the front carrier $C_F$ and the rear ring gear $R_R$ can be suitably coupled by the low clutch L/C.

The front ring gear $R_F$ and the rear carrier $C_R$ are coupled to each other and to the output shaft 5, and the rear sun gear $S_R$ is coupled to the input shaft 4.

Figure 2:
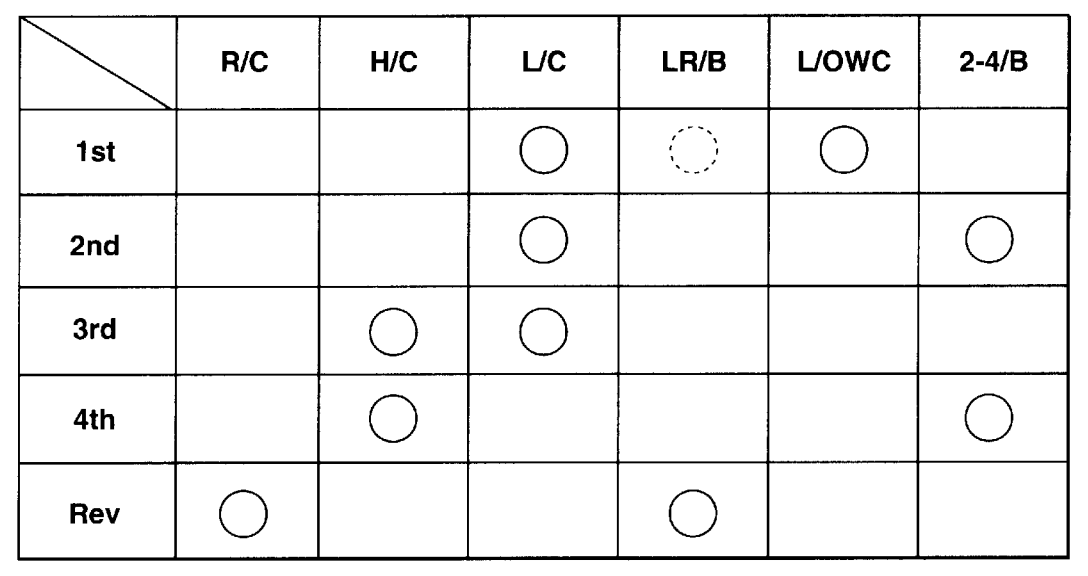

The power transmission train of the planetary gear transmission mechanism thus far described is enabled to establish: forward gear stages of a forward first speed (1st), a forward second speed (2nd), a forward third speed (3rd) and a forward fourth speed (4th); and a reverse gear stage (Rev) by the selective hydraulic actuations (or engagements), as indicated by solid circles in FIG. 2, of the friction elements L/C, 2–4/B, H/C, LR/B and R/C and by the self engagement, as indicated by a solid circle in the same Figure, of the low one-way clutch L/OWC.

Here, the hydraulic actuation (or engagement) indicated by a dotted circle in FIG. 2 corresponds to the friction element which is to be actuated when an engine braking is necessary.

The engaging logic of the shift controlling friction elements L/C, 2–4/B, H/C, LR/B and R/C, as shown in FIG. 2, is realized by a control valve body 8 shown in FIG. 1. In this control valve body 8, there are mounted not only the not-shown manual valve but also a line pressure solenoid 9, a low clutch solenoid 10, a 2nd/4th brake solenoid 11, a high clutch solenoid 12 and a low reverse brake solenoid 13.

The line pressure solenoid 9 is turned ON/OFF to switch the line pressure or the original pressure for the shift control into high and low levels, and the not-shown manual valve is controlled by the driver to a forward drive (D) range position, a reverse (R) range position or a parking/stop (P, N) range position in accordance with the running mode desired.

In the D-range, the manual valve feeds the line pressure as the original pressure to predetermined circuits so that the duty controls of the working oil pressures of the low clutch solenoid 10, the 2nd/4th brake solenoid 11, the high clutch solenoid 12, the low reverse brake solenoid may control the working oil pressures of the corresponding low clutch L/C, the 2nd/4th brake 2–4/B, the high clutch H/C and the low reverse brake LR/B individually, thereby to realize the engaging logic of the 1st to 4th speeds, as tabulated in FIG. 2, by the duty control of the individual solenoids.

In the R-range, however, the manual valve feeds the line pressure directly not in dependence upon the duty controls of the individual solenoids to the reverse clutch R/C and the low reverse brake LR/B to bring them into engagements thereby to realize the reverse engaging logic, as tabulated in FIG. 2.

Here, in the P or N range, the manual valve feeds the line pressure to no circuit but brings all the friction elements into the disengaging states to set the automatic transmission in a neutral state.

The ON/OFF control of the line pressure solenoid 9 and the duty controls of the low clutch solenoid 10, the 2nd/4th speed brake solenoid 11, the high clutch solenoid 12 and the low reverse brake solenoid 13 are individually executed by a transmission controller 14. To this transmission controller 14, therefore, there are individually inputted: a signal from a throttle opening degree sensor 15 for detecting the throttle opening degree TVO of the engine 1; a signal from a turbine speed sensor 16 for detecting a turbine speed $N_t$ or the output RPM of the torque converter 3 (or the transmission input RPM); a signal from an output speed sensor 17 for detecting the speed ($N_0$) of the output shaft 5 of the automatic transmission 2, a signal from an inhibitor switch 18 for detecting the selected range, and signals from the engagement side friction elements to be applied to engage at a changeover shifting time, i.e., an oil pressure switch group 19 which is arranged in the high clutch H/C at a 2→shifting time, in the 2nd/4th speed brake 2–4/B at a 3→2 shifting time, in the 2nd/4th brake 2–4/B at a 3→4 shifting time and in the low clutch L/C at a 4→3 shifting time, as apparent from FIG. 2.

Here, each switch of the oil pressure switch group 19 is turned ON when the working oil pressure of the corresponding friction elements takes a level to end the loss stroke of the friction elements and to start establishment of an engaging capacity.

Here will be described the automatic speed changing actions in the D-range according to the invention. The transmission controller 14 executes the not-shown control program and retrieves a preferable gear stage demanded in the current drive state from the throttle opening degree TVO and the transmission output speed $N_0$ (or the vehicle speed) on the basis of a predetermined shift map.

Next, the transmission controller 14 decides whether or not the currently selected gear stage is identical to the preferable one. If the answer of this decision is NO, the transmission controller 14 issues a shift command and changes the working oil pressure of the corresponding friction elements by the duty controls of the solenoids 10 to 13 so that a shift to the preferable gear stage may be executed, that is, so that the engagement/disengagement of the friction elements for that shift may be switched on the basis of the engaging logic table of FIG. 2.

Here will be described changeover shift such as the shift between the 2nd speed and the 3rd speed or between the 3rd speed and the 4th speed, which is made by causing, while releasing a friction element by lowering the working oil pressure, another friction element to engage by raising the working oil pressure. When this shift is exemplified by the drive upshift due to the rise in the vehicle speed in the positive drive state (i.e., the drive state contrary to the engine brake), a disengagement side working oil pressure command value $P_O$ or a command value of the working oil pressure of the friction element to disengage and an engagement side working oil pressure command value $P_C$ or a command value of the working oil pressure of a friction element to engage are respectively fed, as indicated by solid lines in FIG. 10(*a*), for a low throttle opening degree (or a low engine load) and, as indicated by broken lines in the same Figure, for a high throttle opening degree (or a high engine load).

In order to make such changeover shift, the transmission controller 14 controls the disengagement side working oil pressure command value $P_O$ and the engagement side working oil pressure command value $P_C$ respectively in time series according to the programs shown in FIGS. 3 to 7.

Figure 3:
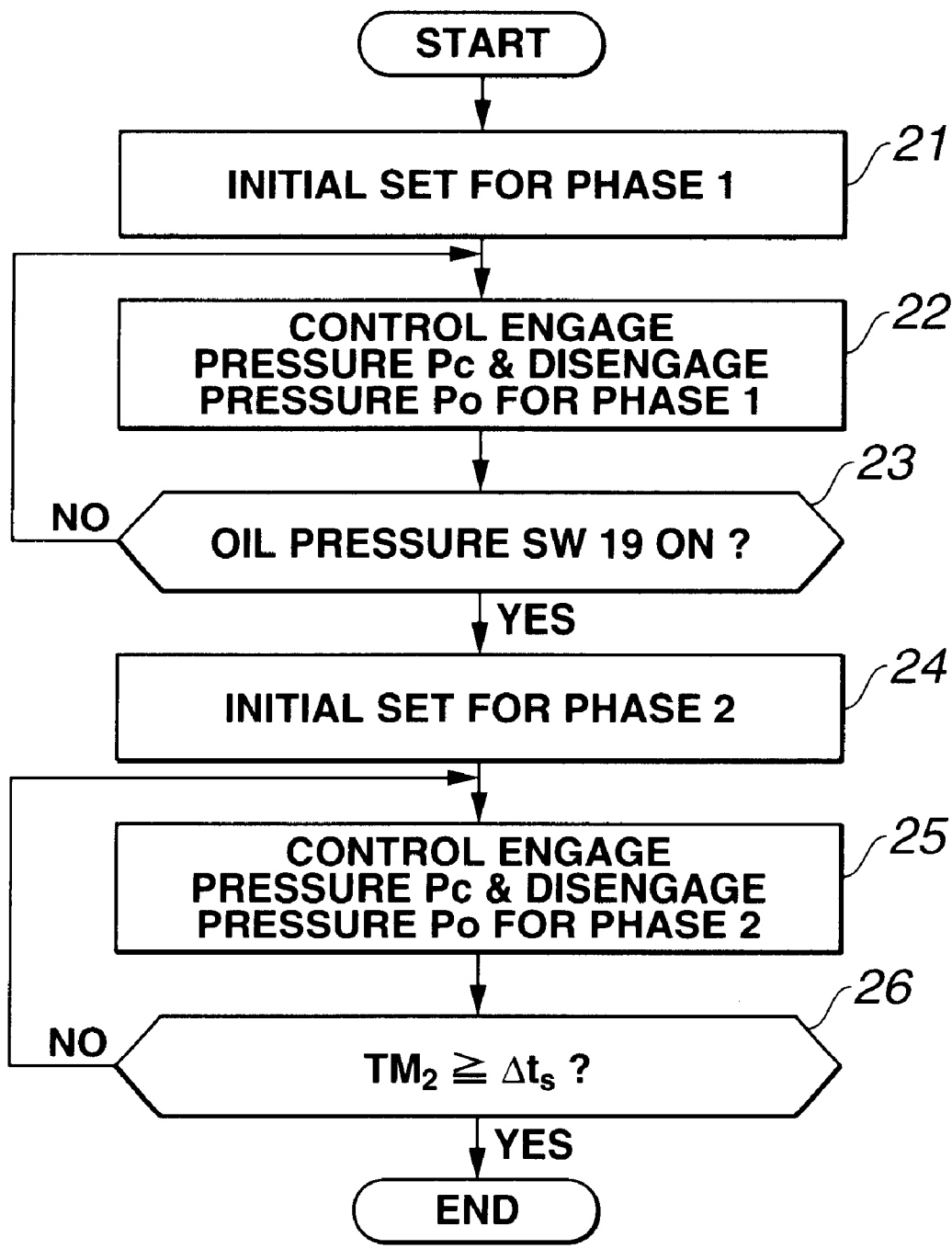
FIG. 3 is a main routine showing a control program of an engagement side working oil pressure command value and a disengagement side working oil pressure command value of the case in which the shift control apparatus of the same Embodiment makes a drive-up change-over shift.

FIG. 3 shows the main routine, and FIGS. 4 to 7 show the individual subroutines. In the main routine of FIG. 3, at first Step 21, initialization is performed for initial setting for Phase 1 from a shift command instant $t_1$ of FIG. 10(*a*) to an instant $t_2$ at which the oil pressure switch 19 turns ON. At next Step 22, the disengagement side working oil pressure command value $P_O$ and the engagement side working oil pressure command value $P_C$ in Phase 1 are determined according to the subroutines of FIGS. 4 and 5.

At Step 23, it is decided whether or not the oil pressure switch 19 of the engagement side friction element has been turned ON. In other words, it is decided whether or not there is reached the instant $t_2$ of FIG. 10A at which the engagement side friction element has ended the loss stroke to start to take the engaging capacity.

Figure 10A:
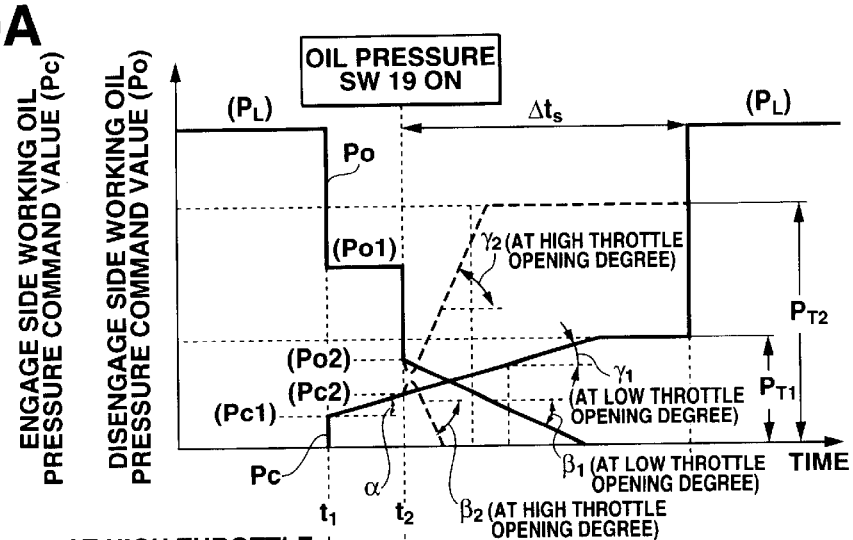
FIG. 10A is a time chart illustrating the time series changes of the engagement side working oil pressure command value and the disengagement side working oil pressure command value.

Until the instant $t_2$ of FIG. 10A is reached, the operations of Step 22 (i.e., the subroutines of FIGS. 4 and 5) are executed to continue the controls of the disengagement side working oil pressure command value $P_O$ and the engagement side working oil pressure command value $P_C$ in Phase 1.

If it is decided at Step 23 that the oil pressure switch 19 of the engagement side friction element is ON, the control of FIG. 10A is transferred, at the instant $t_2$, to Step 24, at which initialization is performed for initial setting for Phase 2 until the elapse of a set time period $\Delta t_S$ from the ON instant $t_2$ of the oil pressure switch 19 of FIG. 10A. At next Step 25, the disengagement side working oil pressure command value $P_O$ and the engagement side working oil pressure command value $P_C$ in Phase 2 are determined according to the subroutines of FIGS. 6 and 7.

At Step 26, it is decided whether or not a timer $TM_2$ for measuring the elapsed time from the ON instant $t_2$ of the oil pressure switch (19) of FIG. 10A indicates the lapse of the set time $\Delta t_S$ for judging the shift end, that is, whether or not Phase 2 has been completed.

If $TM_2 < \Delta t_S$ so that Phase 2 is not completed yet, the operations of Step 25 (i.e., the subroutines of FIGS. 6 and 7) are executed to continue the controls of the disengagement side working oil pressure command value $P_O$ and the engagement side working oil pressure command value $P_C$ in Phase 2. If $TM_2 \geq \Delta t_S$, that is, if Phase 2 is completed, the controls are ended.

Here will be described the control mode of the disengagement side working oil pressure command value $P_O$ in Phase 1, with reference to the subroutine of FIG. 4. At first Step 31, the disengagement side working oil pressure command value $P_O$ in Phase 1 is set to an oil pressure $P_{O1}$.

This set oil pressure $P_{O1}$ has a predetermined value for lowering the disengagement side working oil pressure command value $P_O$ stepwise, as illustrated in FIG. 10A, so as to retain a predetermined disengaging response of the disengagement side friction element.

At next Step 32, the signal from the oil pressure switch 19 is read, and it is decided on the basis of the read signal whether or not the oil pressure switch 19 is ON, that is, whether or not the instant $t_2$ of FIG. 10A is reached at which the engagement side friction element has ended the loss stroke to start to take the engaging capacity.

Figure 6:
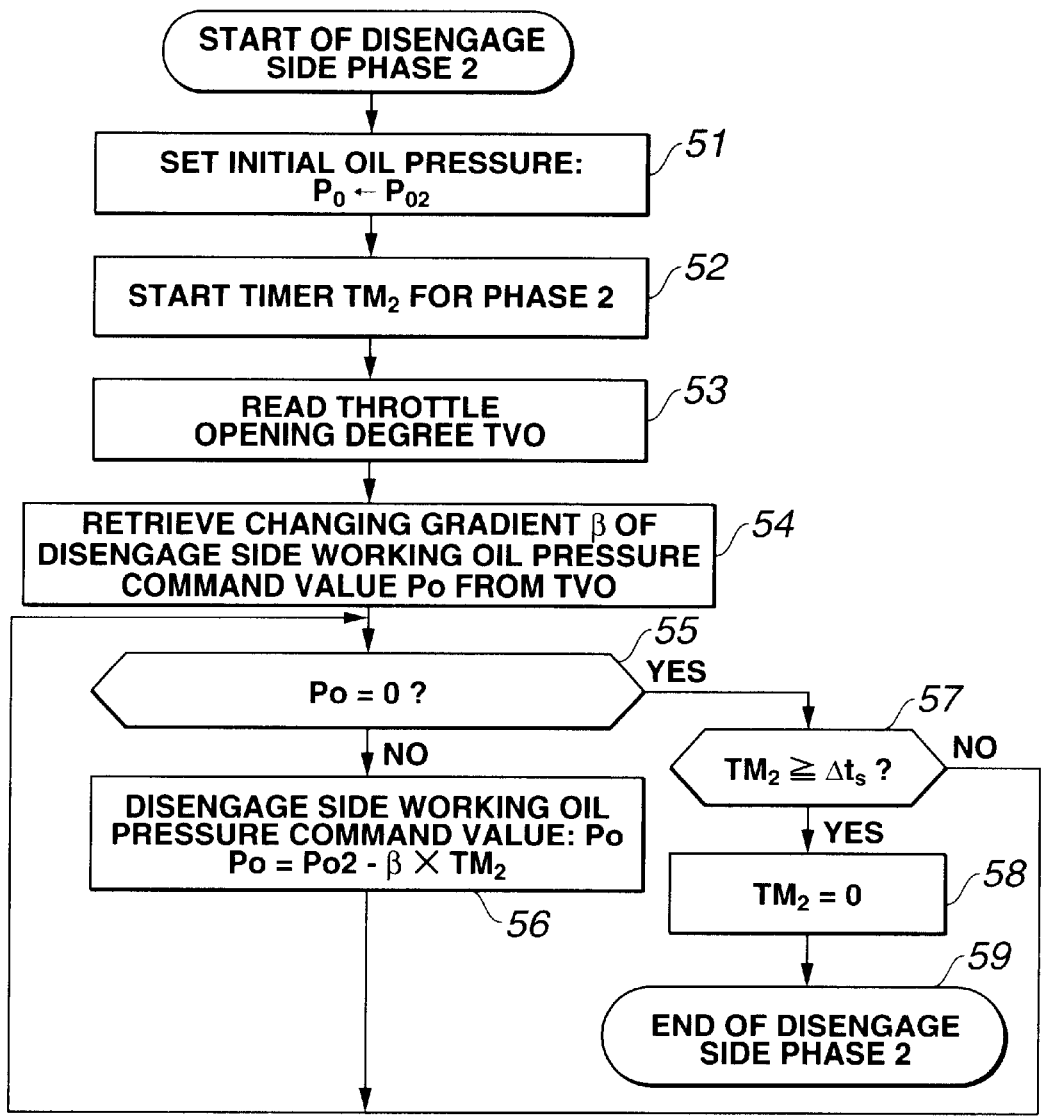
FIG. 6 is a subroutine showing such a control program of a disengagement side working oil pressure command value as is executed in Phase 2 of the same drive-up changeover shift.

Until the instant $t_2$ of FIG. 10A is reached, the control to set the disengagement side working oil pressure command value $P_O$ to the set level $P_{O1}$ is continued at Step 34. When the instant $t_2$ of FIG. 10(a) is reached, the control is transferred to Step 35, at which the control of the disengagement side working oil pressure command value $P_O$ is ended and the control of the disengagement side working oil pressure command value $P_O$ in Phase 2 is started, as shown in FIG. 6.

In Phase 1, therefore, the disengagement side working oil pressure command value $P_O$ is held at the set level $P_{O1}$, as illustrated in FIG. 10A.

Figure 5:
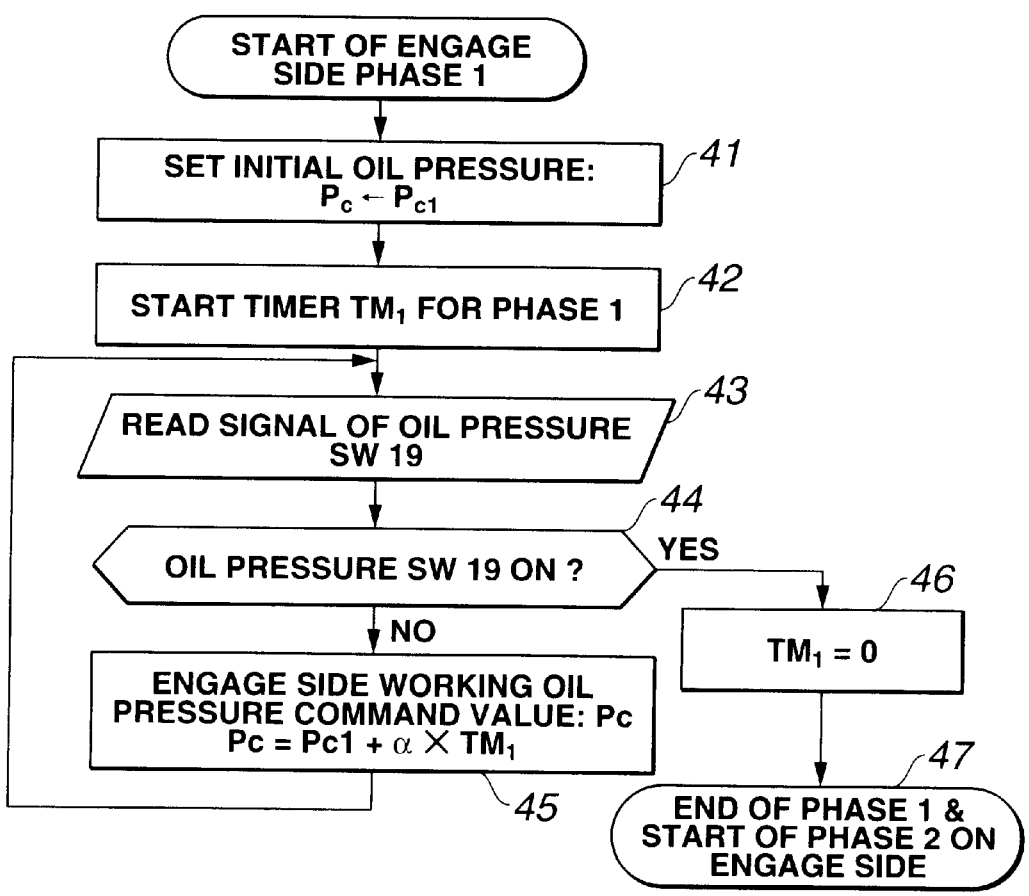
FIG. 5 is a subroutine showing such a control program of an engagement side working oil pressure command value as is executed in Phase 1 of the same drive-up changeover shift.

The control of the engagement side working oil pressure command value $P_C$ in the same Phase 1 is shown in FIG. 5. At first Step 41, the engagement side working oil pressure command value $P_C$ is set to an initial oil pressure $P_{C1}$. This initial oil pressure $P_{C1}$ is exemplified in FIG. 10A by a stepwise setting to the engagement side working oil pressure command value $P_C$ so that the loss stroke of the engagement side friction element may be ended as early as possible.

At next Step 42, a timer $TM_1$ is started for measuring the elapsed time from the shift command instant $t_1$ of FIG. 10A (i.e., the elapsed time period from the start of Phase 1).

At next Step 43, the signal from the oil pressure switch 19 is read, and it is decided on the basis of the read signal whether or not the oil pressure switch 19 is ON, that is, whether or not the instant $t_2$ of FIG. 10A is reached at which the engagement side friction element has ended the loss stroke and started to take the engaging capacity.

Until the instant $t_2$ of FIG. 10A is reached, the engagement side working oil pressure command value $P_C$ is determined at Step 45, by an equation of $P_C = P_{C1} + \alpha \times TM_1$ so that the engagement side working oil pressure command value $P_C$ may rise at a predetermined gradient $\alpha$, as shown in FIG. 10A, from the initial oil pressure $P_{C1}$.

Here, the aforementioned predetermined gradient $\alpha$ is set to the largest gradient within the range in which the engaging shock of the engagement side friction element does not occur at the instant $t_2$ of FIG. 10A for the engagement side working oil pressure command value $P_C$ to end the loss stroke of the engagement side friction element, so that the loss stroke of the engagement side friction element is ended within the shortest time period.

Figure 7:
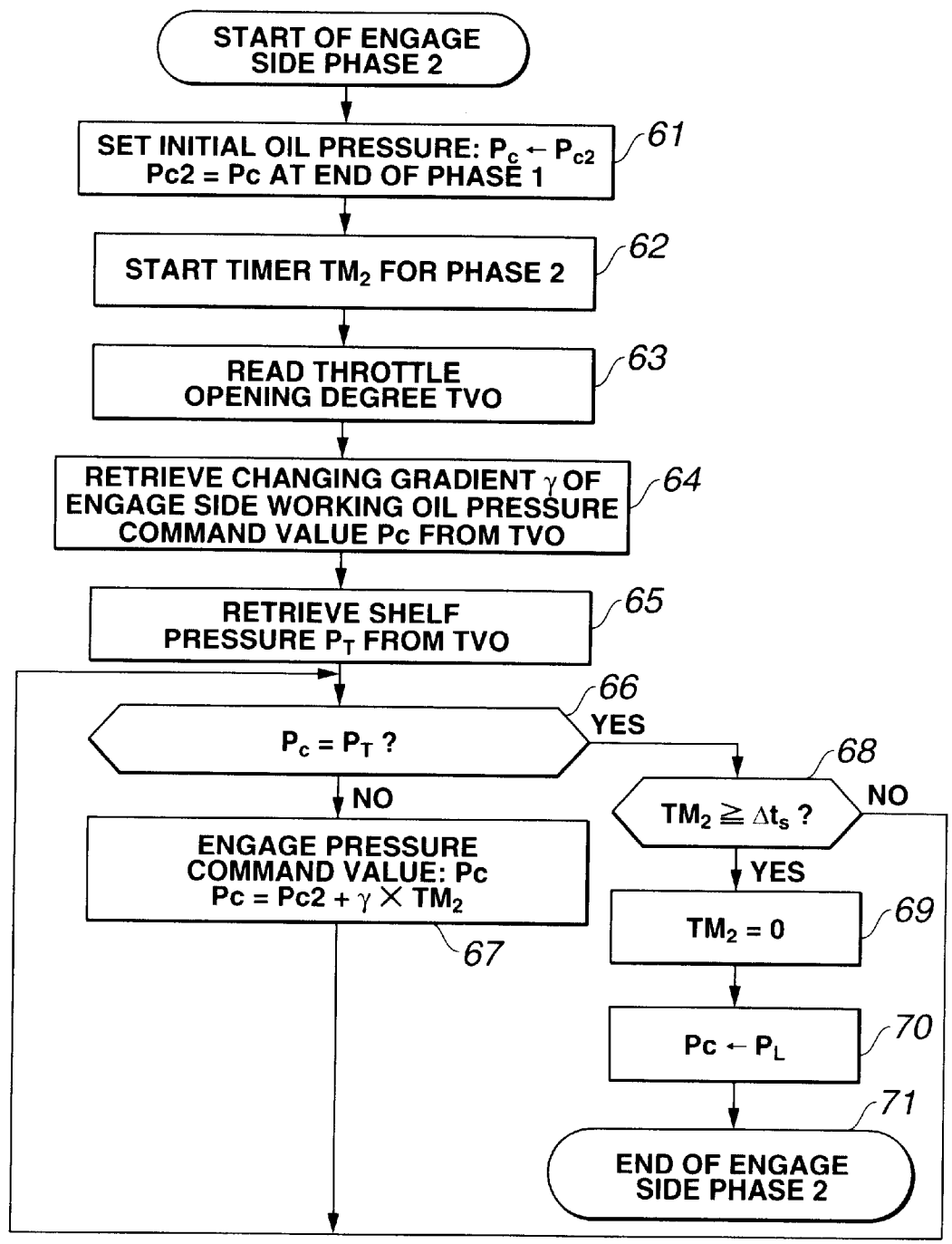
FIG. 7 is a subroutine showing such a control program of an engagement side working oil pressure command value as is executed in Phase 2 of the same drive-up changeover shift.

At the instant $t_2$ of FIG. 10A when it is decided at Step 44 what the oil pressure switch 19 is ON, the control is transferred to Step 46, at which the timer $TM_1$ of Phase 1 is reset to 0. At Step 47, the control of the engagement side working oil pressure command value $P_C$ in Phase 1 is ended, and instead the control of the engagement side working oil pressure command value $P_C$ in Phase 2 is started, as shown in FIG. 7.

At Phase 1, therefore, the engagement side working oil pressure command value $P_C$ is raised stepwise at the shift command instant $t_1$ to the aforementioned initial oil pressure $P_{C1}$, as illustrated in FIG. 10A, and is then increased at the predetermined gradient a from that initial oil pressure $P_{C1}$ to the level to give the engaging capacity to the engagement side friction element.

With reference to the subroutine of FIG. 6, here will be described the control mode of the disengagement side working oil pressure command value $P_O$ in Phase 2. At first Step 51, there is set an initial oil pressure $P_{O2}$ which relates to the disengagement side working oil pressure command value $P_O$ in Phase 2.

This initial oil pressure $P_{O2}$ is prepared as a map, in which the disengagement side working oil pressure command value $P_O$ is further lowered stepwise at the instant $t_2$ of FIG. 10A from the set level $P_{O1}$ in Phase 1 to a predetermined level for setting the disengagement side friction element into the state just before the slip starts, so as to retain a predetermined disengaging response of the disengagement side friction element and in which the disengagement side working oil pressure command value $P_O$ is made the higher for the higher throttle opening degree TVO. On the basis of this map, the initial oil pressure $P_{O2}$ is retrieved and determined from the throttle opening degree TVO and is set as the oil pressure command value $P_O$, as described above.

At Step 52, the timer $TM_2$ is started for measuring the elapsed time period from the instant $t_2$ of FIG. 10A at which the oil pressure switch (19) is ON (i.e., the elapsed time period from the start of Phase 2).

Figure 8:
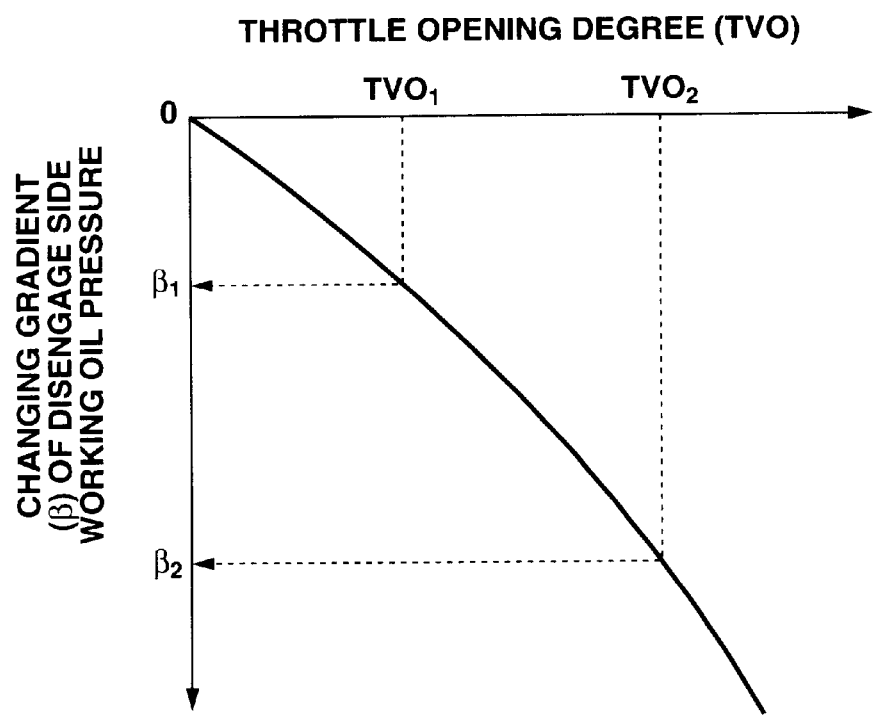
FIG. 8 is a diagram illustrating the changing characteristics of a changing gradient of the disengagement side working oil pressure command value against a throttle opening degree.

Next, at Step 53, the throttle opening degree TVO is read. At Step 54, a changing gradient β of the disengagement side working oil pressure command value $P_O$ is determined from the throttle opening degree TVO by retrieval on the basis of the map, as illustrated in FIG. 8.

Here, the changing gradient β of the disengagement side working oil pressure command value $P_O$ is so designed to provide a steeper decrease of the disengagement side working oil pressure command value $P_O$ for the higher throttle opening degree TVO, and is determined so that $β=β_1$ when the throttle opening degree TVO is a low throttle opening degree $TVO_1$ and $β=β_2$ when the throttle opening degree TVO is a high throttle opening degree $TVO_2$.

Next, at Step 55, it is checked whether or not the disengagement side working oil pressure command value $P_O$ has reduced to 0. Before the disengagement side working oil pressure command value $P_O$ reduces to 0, the disengagement side working oil pressure command value $P_O$ is determined at Step 56, by an equation of $P_O = P_{O2} - β \times TM_2$ so that it may be lowered at a predetermined gradient, as exemplified by $β_1$ (for a low throttle opening degree) and $β_2$ (for a high throttle opening degree) in FIG. 10A, from the aforementioned initial oil pressure $P_{O2}$.

At Step 55, it is checked whether or not the disengagement side working oil pressure command value $P_O$ has reduced to 0. If the answer of this check is YES, it is decided at Step 57 whether or not the timer $TM_2$ for measuring the elapsed time period from the start of Phase 2 indicates a value equal to or more than the set time $\Delta t_S$ for judging the shift end, as illustrated in FIG. 10A, and the control is returned to Step 55 till $TM_2 \geq \Delta t_S$, to keep the disengagement side working oil pressure command value $P_O$ at 0.

At the time of determining, at Step 57, whether or not $TM_2 \geq \Delta t_S$, the timer $TM_2$ is reset to 0 at Step 58, and the control of the disengagement side working oil pressure command value $P_O$ in Phase 2 is ended at Step 59.

In Phase 2, therefore, the disengagement side working oil pressure command value $P_O$ is decreased, as illustrated in FIG. 10A, stepwise from the set oil pressure $P_{O1}$ in Phase 1 to the initial oil pressure $P_{O2}$, and then further decreased from the initial oil pressure $P_{O2}$ at the predetermined gradient $\beta_1$ (for the low throttle opening degree) or $\beta_2$ (for the high throttle opening degree) in dependence on the throttle opening degree TVO (or the engine load), to 0 finally, thereby to reduce the engaging capacity of the disengagement side friction element gradually.

The control of the engagement side working oil pressure command value $P_C$ in the same Phase 2 is shown in FIG. 7. At first Step 61, the engagement side working oil pressure command value $P_C$ is set to the initial oil pressure $PC_2$, which takes the level of the engagement side working oil pressure command value $P_C$ at the end of Phase 1, i.e., at the instant $t_2$ of FIG. 10A when the engagement side friction element ends the loss stroke so that the oil pressure switch 19 is turned ON.

Figure 10A:
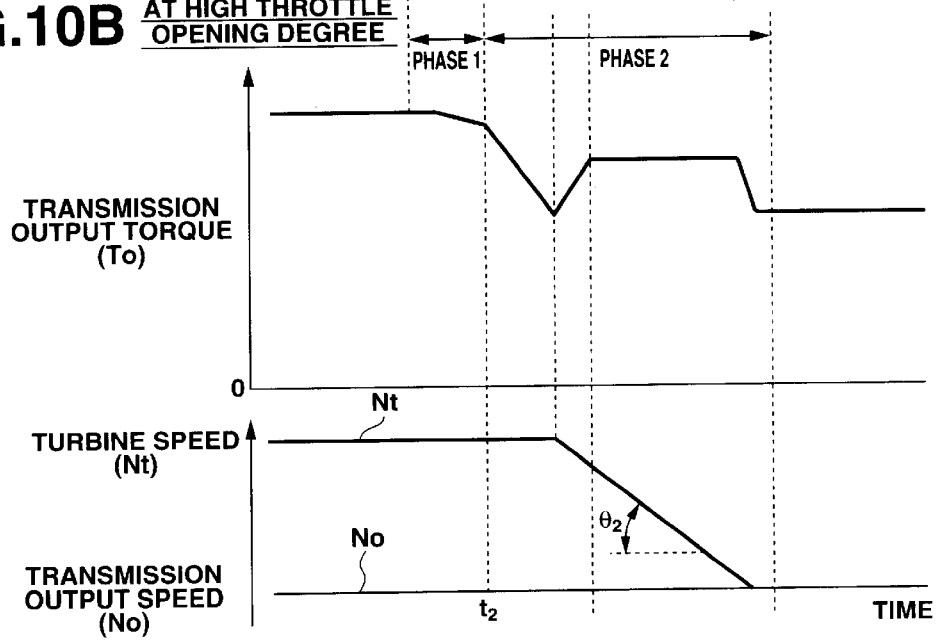
Figure 10A:
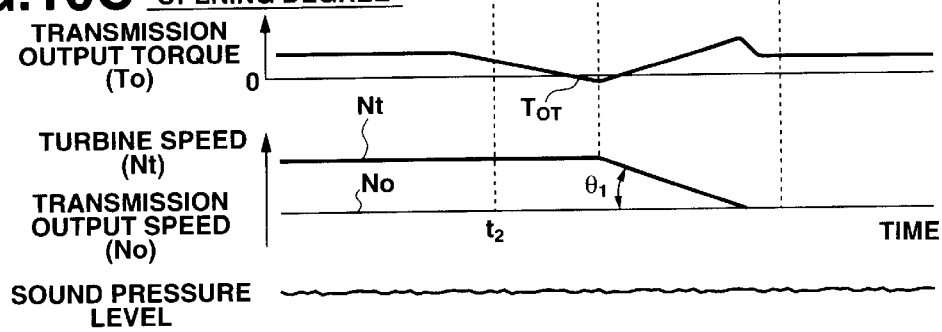

At next Step 62, the timer $TM_2$ is started for measuring the elapsed time period from the instant $t_2$ of FIG. 10($a$), at which the oil pressure switch (19) turns ON (that is, the elapsed time period from the start of Phase 2).

Figure 9:
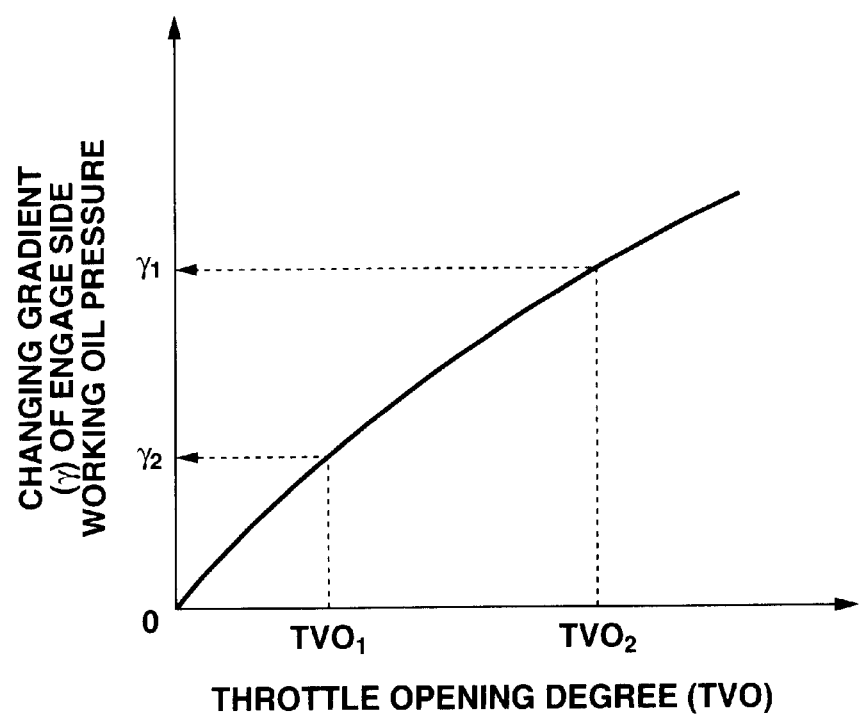
FIG. 9 is a diagram illustrating the changing characteristics of a changing gradient of the engagement side working oil pressure command value against a throttle opening degree.

Next, at Step 63, the throttle opening degree TVO is read. At Step 64, a changing gradient $\gamma$ of the engagement side working oil pressure command value $P_C$ is determined from the throttle opening degree TVO by retrieval on the basis of the map, as illustrated in FIG. 9.

Here, the changing gradient $\gamma$ of the engagement side working oil pressure command value $P_C$ is so set that the increase of the engagement side working oil pressure command value $P_C$ becomes steeper as the throttle opening degree TVO increases, and is determined so that $\gamma=\gamma_1$ when the throttle opening degree TVO is a low throttle opening degree $TVO_1$ and that $\gamma=\gamma_2$ when the throttle opening degree TVO is a high throttle opening degree $TVO_2$.

At next Step 65, from the throttle opening degree TVO, there is retrieved a corresponding shelf pressure $P_T$, which has a level to end the inertia phase as short as possible within a range free from shift shock, as well known in the art. Therefore, the shelf pressure $P_T$ is set to a low level, as indicated by $P_{T1}$ in FIG. 10A, when the throttle opening degree TVO is as low as the aforementioned low throttle opening degree $TVO_1$, and to a high level, as indicated by $P_{T2}$ in FIG. 10A, when the throttle opening degree TVO is as high as the aforementioned high throttle opening degree $TVO_2$.

Next, at Step 66, it is checked whether or not the engagement side working oil pressure command value $P_C$ has risen to the shelf pressure $P_T$. Until the engagement side working oil pressure command value $P_C$ rises to the shelf pressure $P_T$, the engagement side working oil pressure command value $P_C$ is determined, at Step 67, by an operation of $P_C=P_{C2}+\gamma \times TM_2$ so that it may be raised at a predetermined gradient, as exemplified by $\gamma_1$ (for a low throttle opening degree) and $\gamma_2$ (for a high throttle opening degree) in FIG. 10($a$), from the aforementioned initial oil pressure $P_{C2}$.

When it is decided at Step 66 that the engagement side working oil pressure command value $P_C$ has risen to the shelf pressure $P_T$, it is decided at Step 68 whether or not the timer $TM_2$ for measuring the elapsed time period from the start of Phase 2 indicates the set time $\Delta t_S$ for judging the shift end, as illustrated in FIG. 10A, and the control is returned to Step 66 till the condition of $TM_2 \geq \Delta t_S$ is reached, to keep the engagement side working oil pressure command value $P_C$ at the shelf pressure $P_T$.

When it is decided at Step 68 whether or not $TM_2 \geq \Delta t_S$, moreover, the timer $TM_2$ is reset to 0 at Step 69. At Step 70, the engagement side working oil pressure command value $P_C$ is set to the same highest level as the line Pressure $P_L$ or the original pressure, and the control of the engagement side working oil pressure command value $P_C$ in Phase 2 is ended at Step 71.

In Phase 2, therefore, the engagement side working oil pressure command value $P_C$ is raised, as shown in FIG. 10A, from the initial oil pressure of the oil pressure level $P_{C2}$ at the end of Phase 1, at the predetermined gradient $\gamma_1$ (for the low throttle opening degree) or $\gamma_2$ (for the high throttle opening degree) according to the throttle opening degree TVO (or the engine load), to increase the engaging capacity of the engagement side friction element gradually and is then kept at the predetermined shelf pressure $P_{T1}$ (for the low throttle opening degree) or $P_{T2}$ (for the high throttle opening degree) according to the throttle opening degree TVO (or the engine load) so that it is finally set at the same highest level as the line pressure $P_L$ or the original pressure.

By the decrease of the disengagement side working oil pressure command value $P_O$ with time and the increase of the engagement side working oil pressure command value $P_C$ with time thus far described, the disengagement side friction element is brought into disengagement, and the engagement side friction element is brought into engagement so that they are changed over to effect a predetermined changeover shift.

Here in this embodiment, the rising gradient of the engagement side working oil pressure command value $P_C$ at and after the ON instant $t_2$ of the oil pressure switch of FIG. 10A, when the engagement side friction element ends the loss stroke to take the engaging capacity, is made as low as $\gamma_1$ for the low throttle opening degree (or for the low engine load) but as high as $\gamma_2$ for the high throttle opening degree (or for the high engine load). Therefore, the rate of increase of the working oil pressure after the loss stroke end of the engagement side friction element is made lower at the low throttle opening degree (for the low engine load) than at the high throttle opening degree (for the high engine load).

As apparent from the comparison between FIG. 10B illustrating the time-series changes of the turbine speed $N_t$ (or the transmission input speed) and the transmission output torque $T_O$ at the high throttle opening degree determining the engagement side working oil pressure $P_C$ as indicated by the broken lines in FIG. 10A, and FIG. 10C illustrating the time-series changes of the turbine speed $N_t$ (or the transmission input speed) and the transmission output torque $T_O$, at the low throttle opening degree determining the engagement side working oil pressure $P_C$ as indicated by the solid lines in FIG. 10A, that is, from the comparison between the changing gradients $\theta_1$ and $\theta_2$ ($\theta_1 < \theta_2$) of the turbine speed $N_t$, therefore, the shift (the torque phase and in the inertia phase) advances more slowly at the low throttle opening degree having a lower transmission output torque $T_O$ than at the high throttle opening degree having a higher transmission output torque $T_O$, so that the turbine speed $N_t$ can be slowly varied to an after-shift speed (i.e., the speed of the transmission output speed $N_O$ because the shift is to the 3rd speed having a gear ratio of 1 in the case of FIG. 10).

Figure 13A:
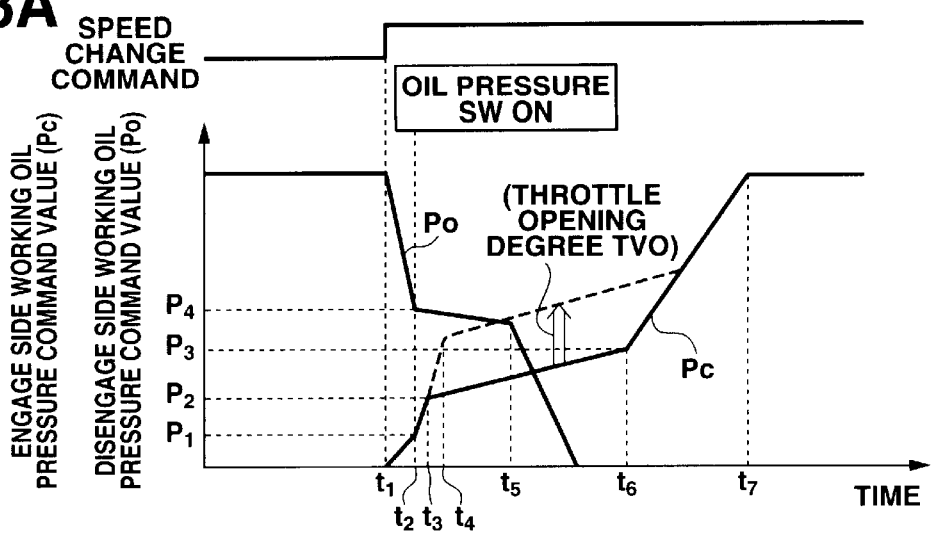
FIG. 13A is a time chart illustrating the time series changes of the engagement side working oil pressure and the disengagement side working oil pressure.
Figure 13A:
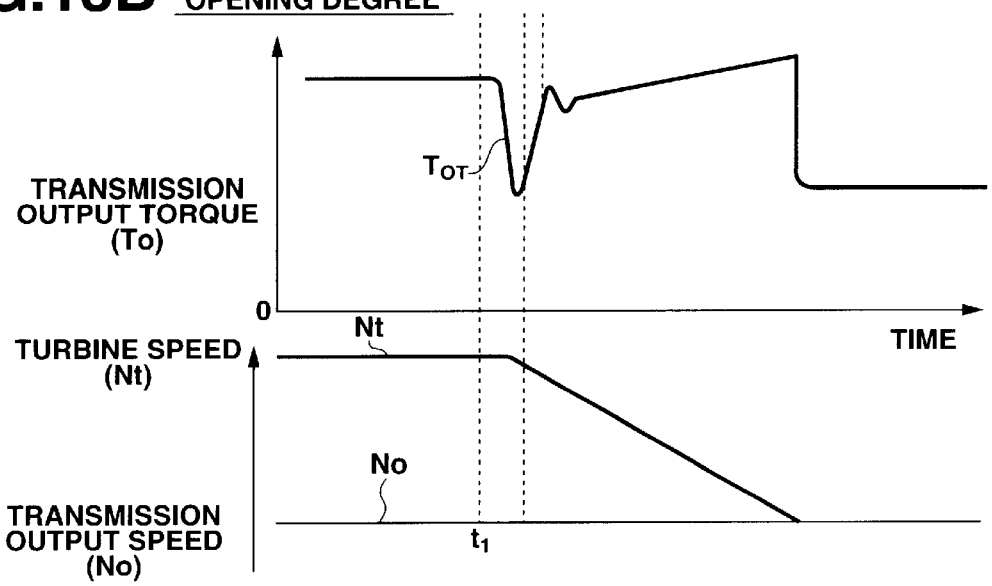
Figure 13A:
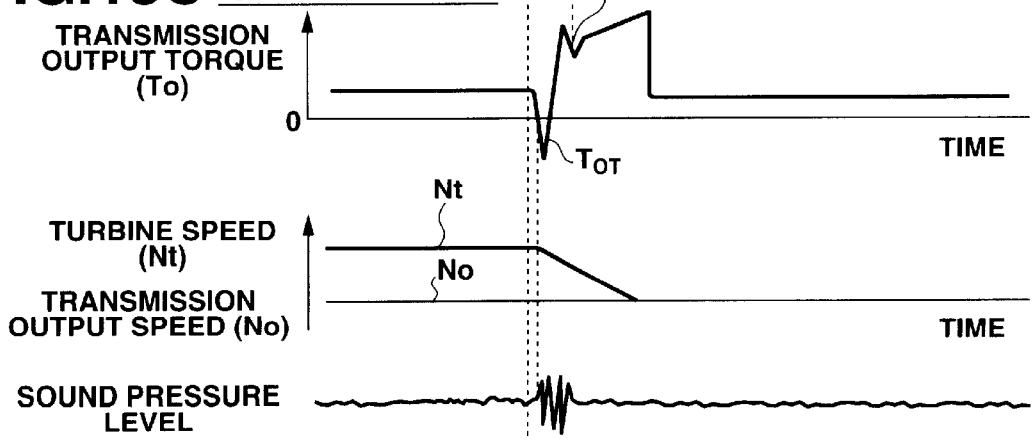

At the low engine load, therefore, the rising rate (or the torque phase advancing rate) of the engagement side working oil pressure command value PC after the loss stroke end of the engagement side friction element is not excessively high. Even if the fall $T_{OT}$ of the torque in the torque phase is caused to establish the zero cross of the transmission output torque, as described with reference to FIG. 13C, by the fact that the transmission output torque $T_O$ is relatively low for the low engine load, as illustrated in FIG. 10C, therefore, the change in the transmission output torque $T_O$ in that zero cross can be made gentle, as illustrated in FIG. 10C, to cause neither any backlash noise, as apparent from the sound pressure level change of FIG. 10C, nor any tossing shock just after the end of the torque phase.

In this embodiment, moreover, the lowering gradient of the disengagement side working oil pressure command value $P_O$ at and after the ON instant $t_2$ of the oil pressure switch of FIG. 10A when the engagement side friction element ends the loss stroke and starts to take the engaging capacity, is made as small as $\beta_1$ at the low throttle opening degree (for the low engine load), and as large as $\beta_2$ at the high throttle opening degree (for the high engine load). Therefore, the lowering gradient of the working oil pressure (or the disengagement side working oil pressure command value $P_O$) to be applied to the disengagement side friction element at and after the loss stroke end of the engagement side friction element is made smaller for the low engine load than for the high engine load.

For the rise in the engagement side working oil pressure command value $P_C$ thus far controlled, therefore, the drop in the disengagement side working oil pressure command value $P_O$ can be properly timed so that the rise in the transmission output torque $T_O$ in the zero cross, as caused by the fall $T_{OT}$ in the torque in the torque phase, can be made so gentle, as illustrated in FIG. 10C, to ensure the aforementioned effect which is obtained by the smooth changeover of the engagement side friction element and the disengagement side friction element.

Here, the upper limit of the engagement side working oil pressure command value $P_C$ to be raised at and after the ON instant $t_2$ of the oil pressure switch of FIG. 10A when the engagement side friction element ends the loss stroke and starts to have the engaging capacity, that is, the shelf pressure PT (e.g., $P_{T1}$ or $P_{T2}$) of the engagement side working oil pressure command value $P_C$ may be set equal to the sum of: the return spring pressure to balance the oil pressure necessary for ending the piston stroke of the engagement side friction element; a torque sharing pressure for the engaging capacity barely capable of transmitting the transmission input torque determined according to the throttle opening degree TVO; and an inertia induced pressure necessary for advancing the inertia phase by varying the engine speed or the torque converter speed to the value after the shift.

In this case, the working oil pressure of the engagement side friction element for advancing the inertia phase after the torque phase can take a proper level for generating a proper engaging capacity to advance the inertia phase properly.

Embodiment 2

Here will be described Embodiment 2 corresponding to claims 4 to 7. This Embodiment 2 is approximately identical to Embodiment 1, as shown in FIGS. 1 to 10, in the construction and in the main routine and the subroutines, but is slightly different in the control program of the disengagement side working command value, as executed in Phase 2 of the drive up changeover shift of FIG. 11 corresponding to FIG. 6 showing the subroutine corresponding to the main routine shown in FIG. 3, and in the time chart illustrating the time-series changes of the engagement side working liquid pressure command value and the disengagement side working liquid pressure command value of FIG. 12A corresponding to FIG. 10A.

Figure 4:
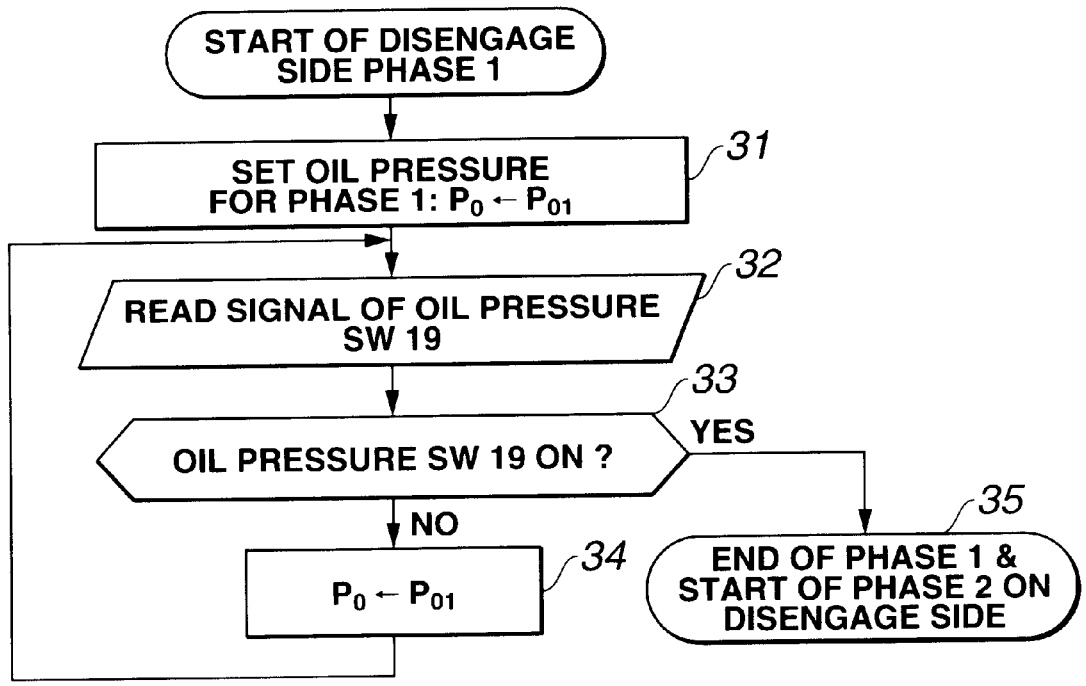
FIG. 4 is a subroutine showing such a control program of a disengagement side working oil pressure command value as is executed in Phase 1 of the same drive-up changeover shift.

First of all, in this Embodiment 2, more specifically, the value of the set oil pressure $P_{O1}$ in the aforementioned subroutine of FIG. 4 is varied according to the level of the throttle opening degree TVO so that the set oil pressure $P_{O1}$ is set to a lower value $P_{O11}$ for the low throttle opening degree and to a higher value $P_{O12}$ for the high throttle opening degree, as illustrated in FIG. 12A.

Figure 11:
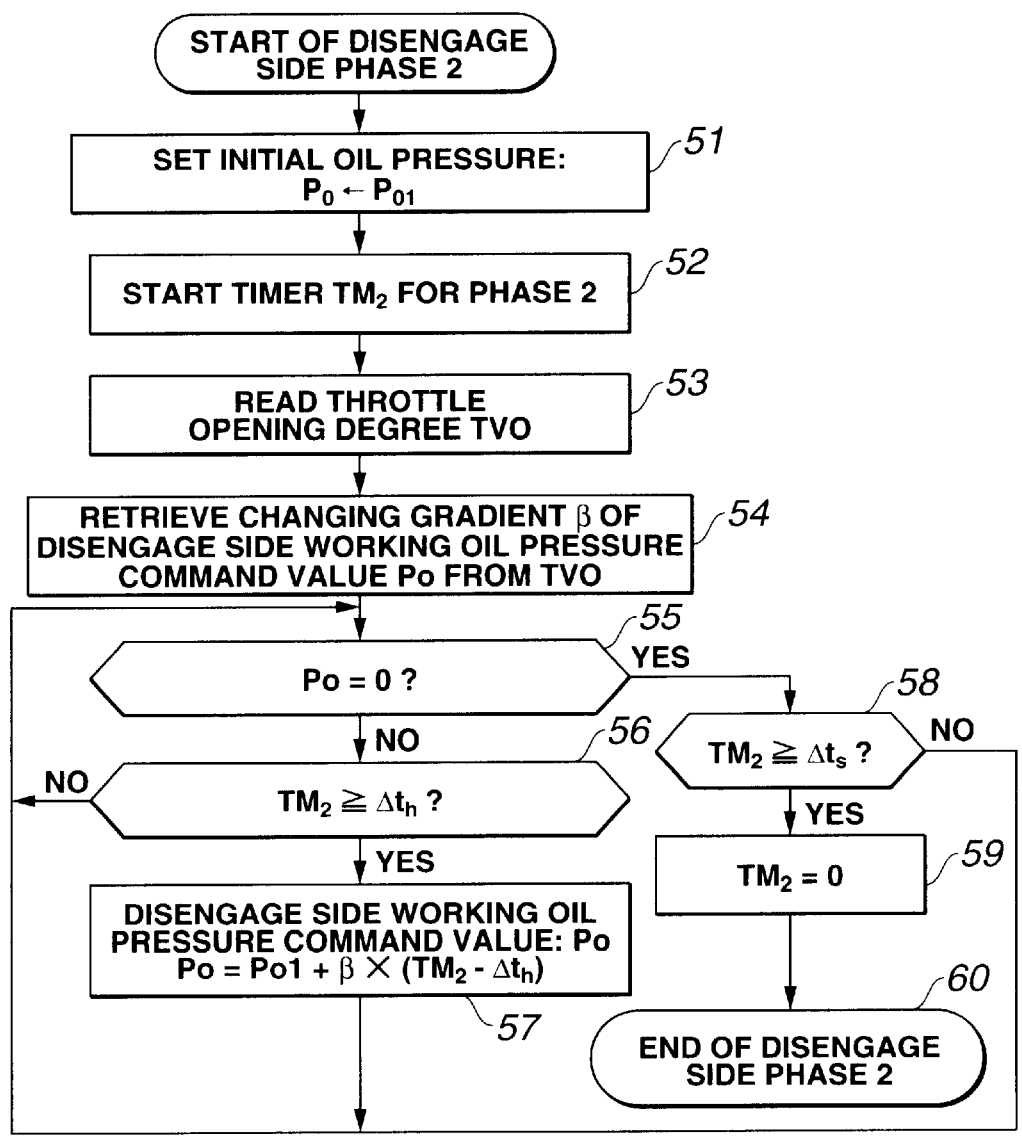
FIG. 11 is a subroutine showing such a control program of the de working oil pressure command value as is executed in Phase 2 of a drive-up changeover shift in Embodiment 2.

Moreover, the control mode of the disengagement side working oil pressure command value $P_O$ in Phase 2 will be described with reference to the subroutine of FIG. 11. At first Step 51, there is set the initial oil pressure $P_{O1}$ relating to the disengagement side working liquid pressure command value $P_O$ in Phase 2. This initial oil pressure $P_{O1}$ is equal to the value at which the disengagement side working liquid pressure command value $P_O$ was held in the preceding Phase 1.

At Step 52, the timer $TM_2$ is started for measuring the elapsed time period (i.e., the elapsed time period from the start of Phase 2) from the ON instant $t_2$ of the oil pressure switch 19 of FIG. 12A. At next Step 53, the throttle opening degree TVO is read. At Step 54, the changing gradient $\beta$ of the disengagement side working liquid pressure command value $P_O$ is determined from that throttle opening degree TVO by retrieval on the basis of the aforementioned map, as illustrated in FIG. 8. Here, the changing gradient $\beta$ of the disengagement side working liquid pressure command value $P_O$ is so set that the decrease of the disengagement side working liquid pressure command value may be steeper for the higher throttle opening degree TVO. The changing gradient is set to $\beta=\beta_1$, when the throttle opening degree TVO is a lower throttle opening degree $TVO_1$, and to $\beta=\beta_2$ when the throttle opening degree TVO is a higher throttle opening degree $TVO_2$.

At next Step 55, it is checked whether or not the disengagement side working liquid pressure command value $P_O$ has decreased to 0. If the disengagement side working liquid pressure command value $P_O$ has not decreased to 0, it is checked at Step 56 whether or not the timer $TM_2$ exceeds a predetermined time period $\Delta t_h$.

Here, this predetermined time period $\Delta t_h$ is a time period from the ON instant $t_2$ of the oil pressure switch, i.e., from the start of Phase 2, to the start of the decrease of the disengagement side working liquid pressure command value $P_O$ at a predetermined gradient, as shown in FIG. 12A. In Phase 2, more specifically, the racing or the like of the engine can be prevented by holding the disengagement side working liquid pressure command value $P_O$ at a constant value ($P_{O1}$) for a predetermined time period ($\Delta t_h$) till the engaging capacity of each of the disengage/engagement side friction elements takes a value of some amount. Here, this value $\Delta t_h$ is also changed according to the throttle opening degree so that it may take a smaller value for the low throttle opening degree and a larger value for the high throttle opening degree, as illustrated in FIG. 12A. When it is decided at this Step 56 that the timer $TM_2$ exceeds the predetermined time period $\Delta t_h$, the control proceeds to Step 57 but otherwise returns to Step 55.

Thereafter, until the disengagement side working liquid pressure command value $P_O$ drops to 0, the disengagement side working liquid pressure command value $P_O$ is determined by an operation of $P_O=P_{O1}-\beta\times(TM_2-\Delta t_h)$ so that it may drop from the aforementioned initial oil pressure $P_{O1}$ at a predetermined gradient, as exemplified by $\beta_1$ (for the low throttle opening degree) and by $\beta_2$ (for the high throttle opening degree) in FIG. 12A.

When it is decided at Step 55 that the disengagement side working liquid pressure command value $P_O$ has dropped to 0, then it is decided at Step 58 whether or not the timer $TM_2$ for measuring the elapsed time period from the start of Phase 2 indicates a value equal to or more than the set time period $\Delta t_S$ for judging the shift end, as illustrated in FIG. 10A. The control is returned to Step 55 till the condition of $TM_2 \geq \Delta t_S$ is reached, and the disengagement side working liquid pressure command value $P_O$ is kept at 0. When it is decided at Step 58 $TM_2 \geq \Delta t_S$, moreover, the timer $TM_2$ is reset to 0 at Step 59. At Step 60, the control of the disengagement side working liquid pressure command value $P_O$ in Phase 2 is ended. In Phase 2, therefore, the disengagement side working liquid pressure command value $P_O$ is lowered stepwise from the set oil pressure $P_O$ in Phase 1 to the initial oil pressure $P_{O1}$, as illustrated in FIG. 12A, and is then further lowered from the initial oil pressure $P_{O1}$ at the predetermined gradient $\beta_1$ (for the low throttle opening degree) or $\beta_2$ (for the high throttle opening degree) according to the throttle opening degree TVO (or the engine load), to 0 finally thereby to reduce the engaging capacity of the disengagement side friction element gradually.

Here, the control of the engagement side working liquid pressure command value $P_C$ in the same Phase 2 is identical to the aforementioned control shown in FIG. 7.

In this Embodiment 2. therefore, by the decrease with time of the disengagement side working command value $P_O$ and the increase with time of the engagement side working liquid pressure command value $P_C$ of the control routine thus far described, the disengagement side friction element is brought into disengagement, and the engagement side friction element is brought into engagement so that they are changed over to execute the predetermined changeover shift.

In this Embodiment 2, as in Embodiment 1, the rising gradient of the engagement side working oil pressure command value $P_C$ at and after the ON instant $t_2$ of the oil pressure switch of FIG. 12A, when the engagement side friction element ends the loss stroke to take the engaging capacity, is made as low as $\gamma_1$ for the low throttle opening degree (or for the low engine load) but as high as $\gamma_2$ for the high throttle opening degree (or for the high engine load). Therefore, the increasing rate of the working oil pressure (or the engagement side working oil pressure $P_C$) after the loss stroke end of the engagement side friction element is made lower at the low throttle opening degree (for the low engine load) than at the high throttle opening degree (for the high engine load).

As apparent from the comparison between FIG. 12B illustrating the time-series changes of the turbine speed $N_t$ (or the transmission input speed) and the transmission output torque $T_O$ at the high throttle opening degree determining the engagement side working oil pressure $P_C$ as indicated by the broken lines in FIG. 12A; and FIG. 12(c) illustrating the time-series changes of the turbine speed $N_t$ (or the transmission input speed) and the transmission output torque $T_O$ at the low throttle opening degree determining the engagement side working oil pressure $P_C$ as indicated by the solid lines in FIG. 12A, that is, from the comparison between the changing gradients $\theta_1$ and $\theta_2$ of the turbine speed $N_t$, therefore, the shift (the torque phase and in the inertia phase) proceeds more slowly ($\theta_1 < \theta_2$) at the low throttle opening degree having a lower transmission output torque $T_O$ than at the high throttle opening degree having a higher transmission output torque $T_O$, so that the turbine speed $N_t$ can be gradually varied to the after-shift speed (i.e., the speed of the transmission output speed No because the shift is to the 3rd speed having a gear ratio of 1 in the case of FIG. 12).

At the low engine load, therefore, the rising rate (or the torque phase advancing rate) of the engagement side working oil pressure command value $P_C$ after the loss stroke end of the engagement side friction element is not excessively high. Even if the fall $T_{OT}$ of the torque in the torque phase causes the zero cross of the transmission output torque, as described with reference to FIG. 13C, by the fact that the transmission output torque $T_O$ is relatively low for the low engine load, as illustrated in FIG. 12C, therefore, the change in the transmission output torque $T_O$ in that zero cross can be made gentle, as illustrated in FIG. 10C, to cause neither any backlash noise, as apparent from the sound pressure level change of FIG. 12C, nor any tossing shock just after the end of the torque phase.

In this embodiment, moreover, the lowering gradient of the disengagement side working oil pressure command value $P_O$ at and after the ON instant $t_2$ of the oil pressure switch of FIG. 12A when the engagement side friction element ends the loss stroke to take the engaging capacity is made as small as $\beta_1$ at the low throttle opening degree (for the low engine load) and as large as $\beta_2$ at the high throttle opening degree (for the high engine load). Therefore, the lowering gradient of the working oil pressure (or the disengagement side working oil pressure command value $P_O$) to be applied to the disengagement side friction element at and after the loss stroke end of the engagement side friction element is made smaller for the low engine load than for the high engine load.

For the rise in the engagement side working oil pressure command value $P_C$ thus far controlled, therefore, the drop in the disengagement side working oil pressure command value $P_O$ can be properly timed so that the rise in the transmission output torque $T_O$ in the zero cross, as caused by the fall $T_{OT}$ in the torque in the torque phase, can be made so gentle, as illustrated in FIG. 12C, to ensure the aforementioned effect which is obtained by the smooth changeover of the engagement side friction element and the disengagement side friction element.

What is claimed is:

1. A shift control apparatus for effecting a shift in an automatic transmission by changeover of friction elements to be engaged with disengagement of a disengagement-side friction element and engagement of a disengagement-side working oil pressure and engagement of an engagement-side friction element by increase of an engagement-side working oil pressure, the shift control apparatus comprising a shift controller configured:

to detect an end of a loss stroke in the engagement-side friction element;

to decrease the disengagement-side working oil pressure at a set gradient after the detection of the end of the loss stroke in the engagement-side friction element;

to increase the engagement-side working oil pressure at a predetermined gradient after the detection of the end of the loss stroke in the engagement-side friction element; and to make the predetermined gradient of the engagement-side working oil pressure for the engagement-side friction element lower for a low engine load than for a high engine load.

2. A shift control apparatus in claim 1, wherein an upper limit for increasing the working oil pressure for the engagement-side friction element at the predetermined gradient is set equal to the sum of a return spring pressure for balancing an oil pressure required for finishing a piston stroke, a torque sharing pressure for providing an engaging capacity barely capable of transmitting a transmission input torque, and an inertia induced pressure required for advancing an inertia phase.

3. A shift control apparatus as claimed in claim 1, wherein the shift controller is configured to make the set gradient of the disengagement-side working oil pressure lower for the low engine load than for the high engine load.

4. A shift control apparatus as claimed in claim 3, wherein an upper limit for increasing the working oil pressure for the engagement-side friction element at the predetermined gradient is set equal to the sum of a return spring pressure for balancing an oil pressure required for finishing a piston stroke, a torque sharing pressure for providing an engaging capacity barely capable of transmitting a transmission input torque, and an inertia induced pressure required for advancing an inertia phase.

5. A shift control apparatus as claimed in claim 1, wherein the shift control apparatus further comprises a sensor to sense the end of the loss stroke in the engagement-side friction element.

6. A shift control apparatus as claimed in claim 1, wherein the shift controller is configured to start increasing the engagement-side working oil pressure at the predetermined gradient immediately upon detection of the end of the loss stroke in the engagement-side friction element.

7. A shift control apparatus for effecting a shift in an automatic transmission by changeover of friction elements to be engaged with disengagement of a disengagement-side friction element by decrease of a disengagement-side working oil pressure and engagement of an engagement-side friction element by increase of an engagement-side working oil pressure, the shift control apparatus comprising a shift controller configured:

to detect an end of a loss stroke in the engagement-side friction element;

to hold the disengagement-side working oil pressure at a predetermined constant pressure level for a predetermined holding time period starting from the detection of the end of the loss stroke in the engagement-side friction element; and to decrease the disengagement-side working oil pressure at a set gradient after the elapse of the predetermined holding time period.

8. A shift control apparatus as claimed in claim 7, wherein the shift controller is configured to vary the predetermined holding time period in accordance with a throttle opening degree so that the predetermined holding time period is made longer as the throttle opening degree becomes greater, and made shorter as the throttle opening degree becomes smaller.

9. A shift control apparatus as claimed in claim 8, wherein the shift controller is configured to vary the predetermined constant pressure level in accordance with the throttle opening degree so that the predetermined constant pressure level is increased as the throttle opening degree increases, and decreased as the throttle opening degree decreases.

10. A shift control apparatus as claimed in claim 9, wherein the shift controller is configured to vary an increasing gradient of the engagement-side working oil pressure for the engagement-side friction element and a decreasing gradient of the disengagement-side working oil pressure for the disengagement-side friction element in accordance with the throttle opening degree so that each of said gradients is increased as the throttle opening degree increases, and decreased as the throttle opening degree decreases.

11. A shift control apparatus as claimed in claim 7, wherein the shift controller is configured to vary the predetermined constant pressure level in accordance with a throttle opening degree so that the predetermined constant pressure level is increased as the throttle opening degree increases, and decreased as the throttle opening degree decreases.

12. A shift control apparatus as claimed in claim 11, wherein the shift controller is configured to vary an increasing gradient of the engagement-side working oil pressure for the engagement-side friction element and a decreasing gradient of the disengagement-side working oil pressure for the disengagement-side friction element in accordance with the throttle opening degree so that each of said gradients is increased as the throttle opening degree increases, and decreased as the throttle opening degree decreases.

13. A shift control apparatus as claimed in claim 7, wherein the shift controller is configured to vary an increasing gradient of the engagement-side working oil pressure for the engagement-side friction element and a decreasing gradient of the disengagement-side working oil pressure for the disengagement-side friction element in accordance with a throttle opening degree so that each of said gradients is increased as the throttle opening degree increases, and decreased as the throttle opening degree decreases.

14. A shift control apparatus as claimed in claim 7, wherein the shift control apparatus further comprises a sensor to sense the end of the loss stroke in the engagement-side friction element.

* * * * *